(12) United States Patent
Hamada

(10) Patent No.: US 11,459,195 B2
(45) Date of Patent: Oct. 4, 2022

(54) ORIGINAL READING APPARATUS

(71) Applicant: CANON KABUSHIKI KAISHA, Tokyo (JP)

(72) Inventor: Kaoru Hamada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 17/152,583

(22) Filed: Jan. 19, 2021

(65) Prior Publication Data
US 2021/0245979 A1 Aug. 12, 2021

(30) Foreign Application Priority Data
Feb. 6, 2020 (JP) .............................. JP2020-019133

(51) Int. Cl.
*B65H 3/46* (2006.01)
*B65H 3/06* (2006.01)
*H04N 1/00* (2006.01)

(52) U.S. Cl.
CPC ............. *B65H 3/46* (2013.01); *B65H 3/0669* (2013.01); *H04N 1/00018* (2013.01);
(Continued)

(58) Field of Classification Search
CPC ............ B65H 2220/01; B65H 2220/02; B65H 3/5261; B65H 2220/03; B65H 2801/06; B65H 3/0669; B65H 3/0684; B65H 2220/11; B65H 7/02; B65H 2511/51; B65H 2701/1311; B65H 5/062; B65H 2513/50; B65H 1/14; B65H 2403/724; B65H 2511/20; B65H 2513/512; B65H 1/04; B65H 1/266; B65H 2403/72; B65H 2513/10; B65H 2513/514; B65H 2601/521; B65H 3/06; B65H 45/18; B65H 9/006; B65H 2511/10; B65H 2513/53; B65H 2515/32; B65H 2515/34; B65H 29/58; B65H 7/06; B65H 2511/417; B65H 2511/515; B65H 2551/20; B65H 2701/1313; B65H 2801/27; B65H 3/44;
(Continued)

(56) References Cited

U.S. PATENT DOCUMENTS 8,655,229 B2 * 2/2014 Aratachi ............ G03G 15/0806
399/53
9,624,054 B2 * 4/2017 Iino ........................ B65H 5/062
(Continued)

FOREIGN PATENT DOCUMENTS

JP 2014-234287 12/2014

*Primary Examiner* — Negussie Worku
(74) *Attorney, Agent, or Firm* — Venable LLP

(57) ABSTRACT

An original reading apparatus includes a reading unit, a pick-up roller, a feed roller, a conveyance roller, a conveyance motor, a clutch, and a controller unit to control the clutch and the conveyance motor such that the pick-up roller and the feed roller that receive a driving force from the conveyance motor rotate at a given rotation speed. The rotation speed is set to a first speed when reading an original having a first size at a first resolution, to a second speed higher than the first speed when reading an original having the first size at a second resolution lower than the first resolution, and to a third speed lower than the second speed, regardless of designation of the reading resolution, when reading an original having a second size smaller than the first size.

9 Claims, 12 Drawing Sheets

(52) U.S. Cl.
CPC ..... *H04N 1/00602* (2013.01); *H04N 1/00652* (2013.01); *H04N 1/00708* (2013.01); *B65H 2403/82* (2013.01)

(58) Field of Classification Search
CPC ........ B65H 3/5215; B65H 2405/11162; B65H 2511/13; B65H 2511/21; B65H 2511/514; B65H 2513/41; B65H 2513/51; B65H 2555/26; B65H 2601/121; B65H 2801/09; B65H 29/14; B65H 2220/09; B65H 2402/441; B65H 2404/10; B65H 2404/1441; B65H 2404/612; B65H 2407/21; B65H 2511/222; B65H 2511/33; B65H 2511/414; B65H 2511/524; B65H 2801/39; B65H 3/0661; B65H 3/5223; B65H 31/36; B65H 37/04; B65H 39/10; B65H 5/06; B65H 5/26; B65H 5/34; B65H 7/12; B65H 7/20; B65H 9/004; B65H 1/00; B65H 2403/421; B65H 2403/481; B65H 2403/512; B65H 2403/732; B65H 2404/14; B65H 2405/332; B65H 2511/11; B65H 2511/30; B65H 2515/704; B65H 2557/33; B65H 2601/423; B65H 2701/1768; B65H 2701/1912; B65H 3/0607; B65H 3/54; B65H 31/3027; B65H 9/00; B65H 9/14; B65H 9/166; B65H 1/18; B65H 2220/04; B65H 23/188; B65H 2301/33312; B65H 2301/4191; B65H 2301/4212; B65H 2301/42262; B65H 2301/4227; B65H 2301/42324; B65H 2402/31; B65H 2403/20; B65H 2403/422; B65H 2403/51; B65H 2403/53; B65H 2403/722; B65H 2403/725; B65H 2403/942; B65H 2404/1114; B65H 2404/144; B65H 2404/1442; B65H 2404/63; B65H 2404/7231; B65H 2405/1117; B65H 2408/1222; B65H 2511/22; B65H 2513/104; B65H 2513/106; B65H 2513/11; B65H 2513/21; B65H 2513/22; B65H 2513/40; B65H 2513/52; B65H 2515/40; B65H 2515/805; B65H 2515/815; B65H 2515/83; B65H 2515/842; B65H 2551/10; B65H 2551/28; B65H 2553/22; B65H 2553/51; B65H 2557/652652; B65H 2601/251; B65H 2601/2525; B65H 2601/271; B65H 2601/324; B65H 2601/61; B65H 2701/11312; B65H 2701/1829; B65H 29/006; B65H 29/26; B65H 29/40; B65H 29/52; B65H 3/34; B65H 3/46; B65H 3/56; B65H 33/04; B65H 37/06; B65H 5/38; B65H 7/00; B65H 7/04; B65H 85/00; B65H 9/002; B65H 1/06; B65H 1/08; B65H 15/004; B65H 2301/132; B65H 2301/1321; B65H 2301/17; B65H 2301/36; B65H 2301/363; B65H 2301/4213; B65H 2301/422; B65H 2301/42344; B65H 2301/44318; B65H 2301/512125; B65H 2301/51256; B65H 2403/21; B65H 2403/723; B65H 2403/80; B65H 2403/81; B65H 2403/82; B65H 2404/1112; B65H 2404/1116; B65H 2404/6111; B65H 2404/651; B65H 2404/652; B65H 2404/655; B65H 2405/11141; B65H 2405/121; B65H 2405/3321; B65H 2406/32231; B65H 2406/323; B65H 2407/33; B65H 2511/12; B65H 2511/135; B65H 2511/152; B65H 2511/214; B65H 2511/216; B65H 2511/224; B65H 2511/412; B65H 2511/416; B65H 2511/528; B65H 2513/108; B65H 2513/222; B65H 2513/30; B65H 2513/412; B65H 2515/82; B65H 2551/22; B65H 2553/30; B65H 2553/41; B65H 2555/13; B65H 2555/20; B65H 2555/23; B65H 2557/23; B65H 2557/242; B65H 2557/31; B65H 2557/61; B65H 2557/64; B65H 2601/11; B65H 2601/26; B65H 2601/525; B65H 2701/176; B65H 2801/12; B65H 2801/21; B65H 29/125; B65H 29/20; B65H 29/22; B65H 29/32; B65H 29/50; B65H 29/68; B65H 3/00; B65H 3/063; B65H 3/443; B65H 3/446; B65H 3/5238; B65H 3/62; B65H 31/04; B65H 31/24; B65H 31/26; B65H 31/3063; B65H 31/3081; B65H 35/0006; B65H 35/08; B65H 39/06; B65H 39/11; B65H 43/00; B65H 45/142; B65H 5/023; B65H 5/026; B65H 5/24; B65H 7/08; B65H 7/10; B65H 7/125; B65H 83/02; B65H 9/06; B65H 9/103; H04N 1/00602; H04N 1/193; H04N 1/121; H04N 2201/0094; H04N 1/12; H04N 1/00572; H04N 1/00745; H04N 1/00681; H04N 1/00689; H04N 1/00013; H04N 1/0005; H04N 1/00063; H04N 1/00588; H04N 1/0062; H04N 1/00694; H04N 1/00753; H04N 1/1215; H04N 1/31; H04N 2201/0456; H04N 1/00002; H04N 1/00029; H04N 1/00082; H04N 1/00657; H04N 1/00702; H04N 1/0071; H04N 1/00737; H04N 1/04; H04N 1/1013; H04N 1/1017; H04N 1/125; H04N 2201/0081; H04N 1/00005; H04N 1/00037; H04N 1/00076; H04N 1/0009; H04N 1/00236; H04N 1/00265; H04N 1/0032; H04N 1/0049; H04N 1/00525; H04N 1/00567; H04N 1/0057; H04N 1/00578; H04N 1/0058; H04N 1/00604; H04N 1/0061; H04N 1/00612; H04N 1/00649; H04N 1/00655; H04N 1/00705; H04N 1/00748; H04N 1/00758; H04N 1/00774; H04N 1/00782; H04N 1/00785; H04N 1/00795; H04N 1/00798; H04N 1/00822; H04N 1/00896; H04N 1/00952; H04N 1/02815; H04N 1/02855; H04N 1/0289; H04N 1/02895; H04N 1/1026; H04N 1/122; H04N 1/203; H04N 1/32358; H04N 1/33376; H04N 1/506; H04N 2201/0087; H04N 2201/3298; H04N 1/00018; H04N 1/00023; H04N 1/00031; H04N 1/00045; H04N 1/00079; H04N 1/00087; H04N 1/00384; H04N 1/00405; H04N 1/0044; H04N 1/00591; H04N 1/00596; H04N 1/00628; H04N 1/00641; H04N 1/00652; H04N 1/00673; H04N 1/00708; H04N 1/00713; H04N 1/00732; H04N 1/00734; H04N 1/0079; H04N 1/0402; H04N 1/0417; H04N 1/128; H04N 1/1911; H04N 1/23; H04N 1/32464; H04N 1/3248; H04N 1/40087; H04N 1/4052; H04N 1/4074; H04N 1/46; H04N 1/484; H04N 1/6027; H04N 2201/0098; H04N 2201/0414; H04N 2201/0416; H04N 2201/0426; H04N 2201/0434; H04N 2201/0464; H04N 2201/3288; H04N 5/23206; H04N 7/147

USPC .................................................... 271/10.1

See application file for complete search history.

(56) References Cited

U.S. PATENT DOCUMENTS

| | | | |
|---|---|---|---|
| 10,148,851 B2 | 12/2018 | Furukawa et al. | |
| 10,536,599 B2 | 1/2020 | Hamada | |
| 2011/0188095 A1* | 8/2011 | Shiraishi | H04N 1/04 358/474 |
| 2019/0068815 A1* | 2/2019 | Andoh | H04N 1/1215 |
| 2019/0127166 A1* | 5/2019 | Ochi | B65H 3/5215 |
| 2020/0366808 A1* | 11/2020 | Lee | H04N 1/00705 |

* cited by examiner

FIG. 7A

| CONTROL MODE | CONVEYANCE SPEED* | COLOR | MAIN SCANNING RESOLUTION | SUB SCANNING RESOLUTION |
|---|---|---|---|---|
| M1 | V1 | FULL COLOR | 600 | 600 |
| M2 | V2 | FULL COLOR | 300 | 600 |
| M3 | V3 | FULL COLOR | 300 | 300 |
| M4 | V3 | MONOCHROME | 600 | 600 |

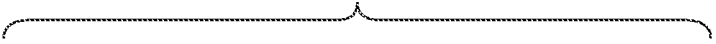

READING QUALITY (USER SELECTION)

| COLOR | MAIN SCANNING RESOLUTION | SUB SCANNING RESOLUTION | | CONTROL MODE |
|---|---|---|---|---|
| FULL COLOR | 600 | 600 | → | M1 |
| FULL COLOR | 300 | 600 | → | M2 |
| FULL COLOR | 300 | 300 | → | M3 |
| MONOCHROME | 600 | 600 | → | M4 |
| MONOCHROME | 300 | 600 | → | M4 |
| MONOCHROME | 300 | 300 | → | M4 |

FIG. 7C

| COLOR | MAIN SCANNING RESOLUTION | SUB SCANNING RESOLUTION | | CONTROL MODE |
|---|---|---|---|---|
| FULL COLOR | 600 | 600 | → | M1 |
| FULL COLOR | 300 | 600 | → | M1 |
| FULL COLOR | 300 | 300 | → | M1 |
| MONOCHROME | 600 | 600 | → | M1 |
| MONOCHROME | 300 | 600 | → | M1 |
| MONOCHROME | 300 | 300 | → | M1 |

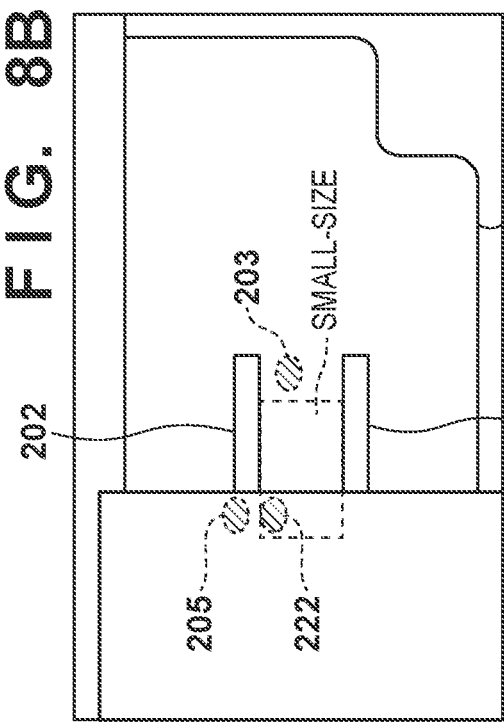
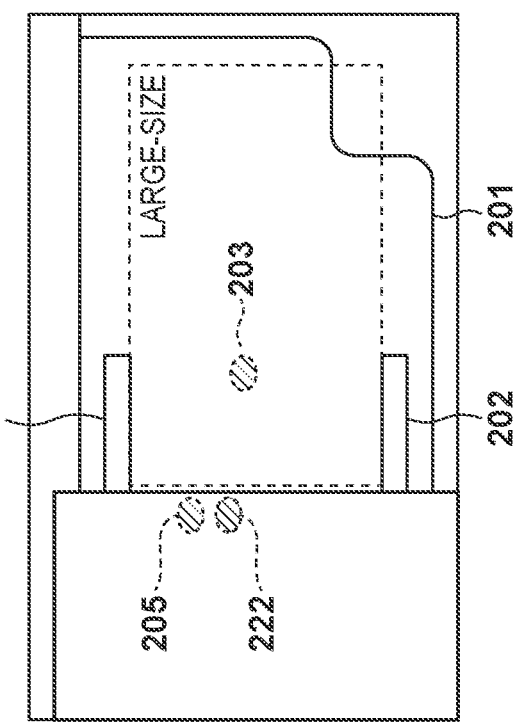
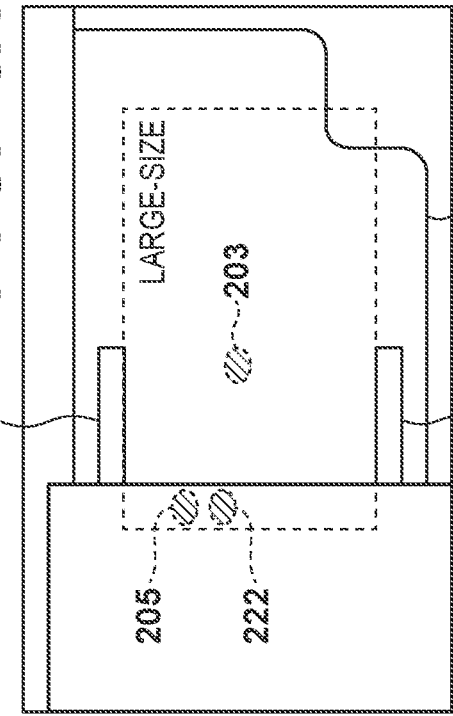
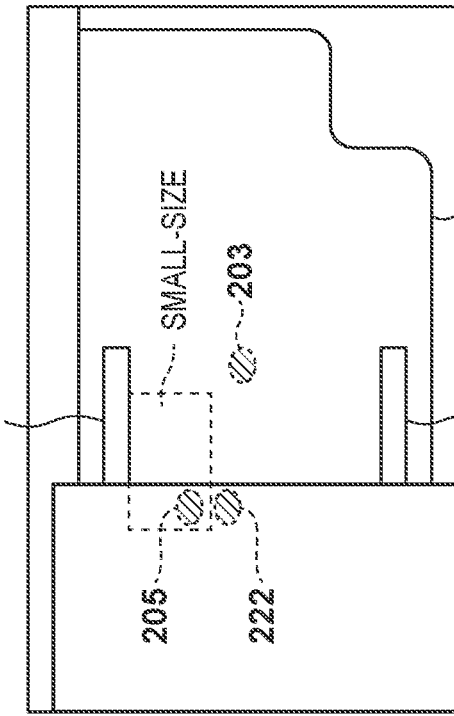

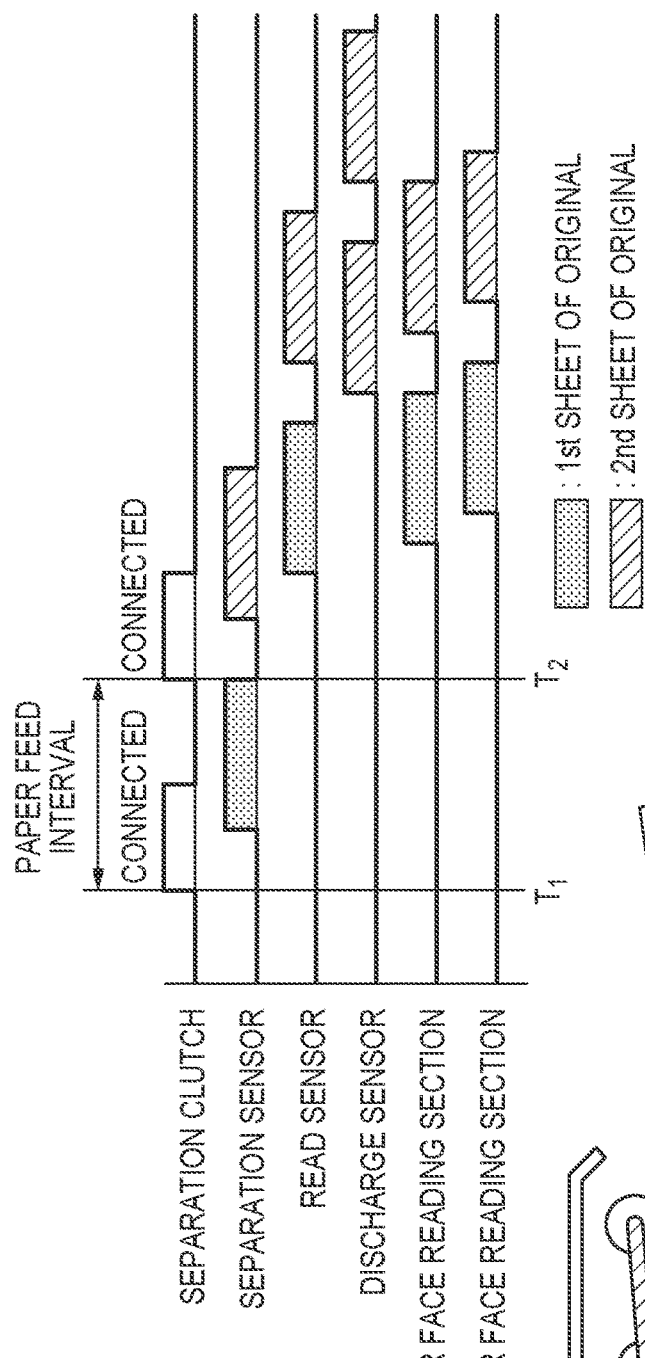
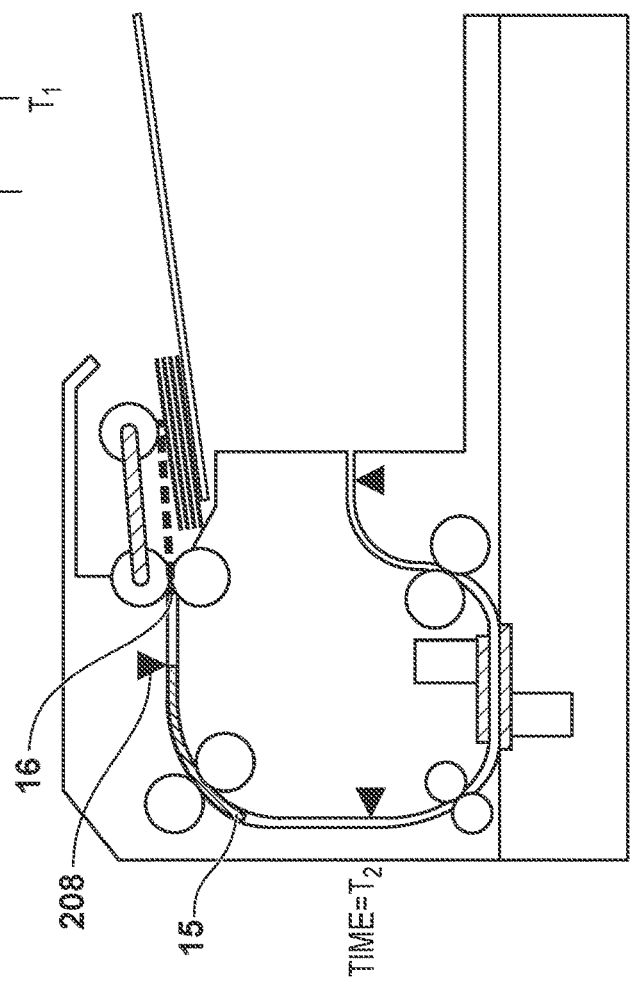

ORIGINAL READING APPARATUS

BACKGROUND OF THE INVENTION

Field of the Invention

The present invention relates to an original reading apparatus for reading an image of an original.

Description of the Related Art

Many original reading apparatuses include an ADF (Auto-Document Feeder) for automatically feeding originals. Images of the originals fed by the ADF are optically read one by one by an image sensor positioned downstream of the conveyance path. A process of reading an image of an original while conveying the original is also called "flow scanning".

Recently, the number of types of originals as read targets of the original reading apparatus is increasing. Japanese Patent Laid-Open No. 2014-234287 discloses a method in which two separating units respectively for cards that are thick and hardly deform and sheets that are thin and easily deform are installed in an original reading apparatus, in order to accurately pick up originals one by one and feed the picked-up originals to a conveyance path.

When conveying a small-sized original such as a name card having a short length in the conveyance direction by using the ADF, the trailing end of the original separates from a pick-up roller earlier than when conveying a large-sized original having a relatively long length in the conveyance direction. As a consequence, the pick-up roller comes in contact with a next original and feeds the next original. This phenomenon is called "overlapped conveyance". If this overlapped conveyance occurs, a preceding original and a next original are conveyed in a state in which the trailing end region of the preceding original and the leading end region of the next original are overlapping each other.

One possible approach to prevent excessive overlapped conveyance is to decrease the original conveyance speed. However, the original conveyance speed generally has a tradeoff relationship with the productivity. For example, even if the user desires a high conveyance speed while permitting a low reading quality by attaching importance to the productivity, the use of the high conveyance speed does not necessarily bring an optimum operation result, depending on the size of an original.

It is, therefore, being desired to eliminate or reduce the inconvenience of original reading caused by overlapped conveyance of small-sized originals.

SUMMARY OF THE INVENTION

According to an aspect of the present invention, there is provided an original reading apparatus including: a reading unit configured to optically read an image of an original; a pick-up roller configured to pick up originals placed on an original tray; a separating and conveying unit including a feed roller and a separating member, and configured to separately convey the originals picked up by the pick-up roller one by one, from a batch of originals, in a separating nip formed by the feed roller and the separating member; a conveyance roller configured to convey the original conveyed by the separating and conveying unit to the reading unit to cause the reading unit to read an image of the original; a conveyance motor configured to generate a driving force for rotating the pick-up roller and the feed roller; a clutch configured to switch between transmission of the driving force from the conveyance motor to the pick-up roller and the feed roller, and shut-off of the transmission; a separation sensor configured to detect the original conveyed between the feed roller and the conveyance roller in a conveyance direction; and a controller unit configured to control the clutch and the conveyance motor. The controller unit is configured to control the clutch to shut off the transmission of the driving force when a leading end of an original being conveyed reaches the conveyance roller, and perform the transmission of the driving force when a trailing end of the original is detected by the separation sensor in order to start conveyance of a subsequent original, and control the conveyance motor such that the pick-up roller and the feed roller that receive the driving force rotate at a given rotation speed. The controller unit is configured to set the rotation speed to a first rotation speed when causing the reading unit to read an original having a first size at a first reading resolution, set the rotation speed to a second rotation speed higher than the first rotation speed when causing the reading unit to read an original having the first size at a second reading resolution lower than the first reading resolution, and set the rotation speed to a third rotation speed lower than the second rotation speed, regardless of designation of the reading resolution, when causing the reading unit to read an original having a second size smaller than the first size. An original having the second size has an original length shorter than a distance from the pick-up roller to the conveyance roller in the conveyance direction.

Further features of the present invention will become apparent from the following description of exemplary embodiments (with reference to the attached drawings).

BRIEF DESCRIPTION OF THE DRAWINGS

FIG. 7A is a first explanation view for explaining a table showing the correspondence between the reading quality, the control mode, and the conveyance speed;

FIG. 7B is a second explanation view for explaining a table showing the correspondence between the reading quality, the control mode, and the conveyance speed;

FIG. 7C is a third explanation view for explaining a table showing the correspondence between the reading quality, the control mode, and the conveyance speed;

FIG. 8A is a first explanation view for explaining an example of a method of detecting the original size;

FIG. 8B is a second explanation view for explaining an example of the method of detecting the original size;

FIG. 8C is a third explanation view for explaining an example of the method of detecting the original size;

FIG. 8D is a fourth explanation view for explaining an example of the method of detecting the original size;

FIG. 10A is a timing chart showing an original feed timing in the embodiment;

FIG. 10B is an explanation view showing an example of the positional relationship between originals in the embodiment;

DESCRIPTION OF THE EMBODIMENTS

Figure 1:
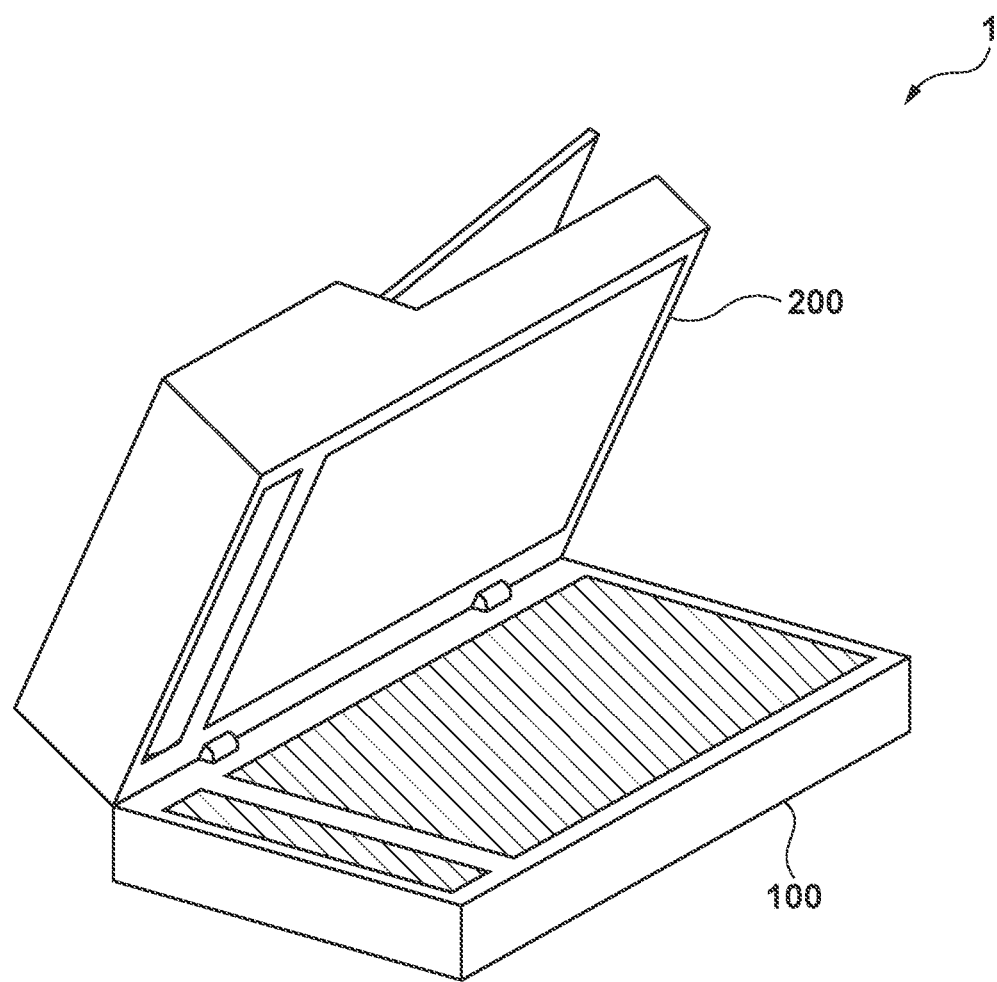
FIG. 1 is a perspective view showing an example of the outer appearance of an original reading apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. Configuration of Apparatus

In this section, an example in which the technique according to this disclosure is applied to a scanner will mainly be explained. However, the technique according to this disclosure is widely applicable to original reading apparatuses not limited to the scanner. Each of constituent elements such as apparatuses, devices, modules, and chips can be configured by either a single entity or a plurality of physically different entities, unless otherwise specified.

FIG. 1 is a perspective view showing an example of the outer appearance of an original reading apparatus 1 according to an embodiment. The original reading apparatus 1 includes a reading unit 100 and an ADF 200. The reading unit 100 includes, in a housing, a controller for controlling the operation of the original reading apparatus 1, and an image sensor for optically reading an original. The ADF 200 automatically conveys an original along a conveyance path to the reading unit 100. In this example shown in FIG. 1, the ADF 200 is connected to the reading unit 100 so as to be openable and closable, by a pair of hinges formed on one long side of the upper surface of the reading unit 100.

Figure 2:
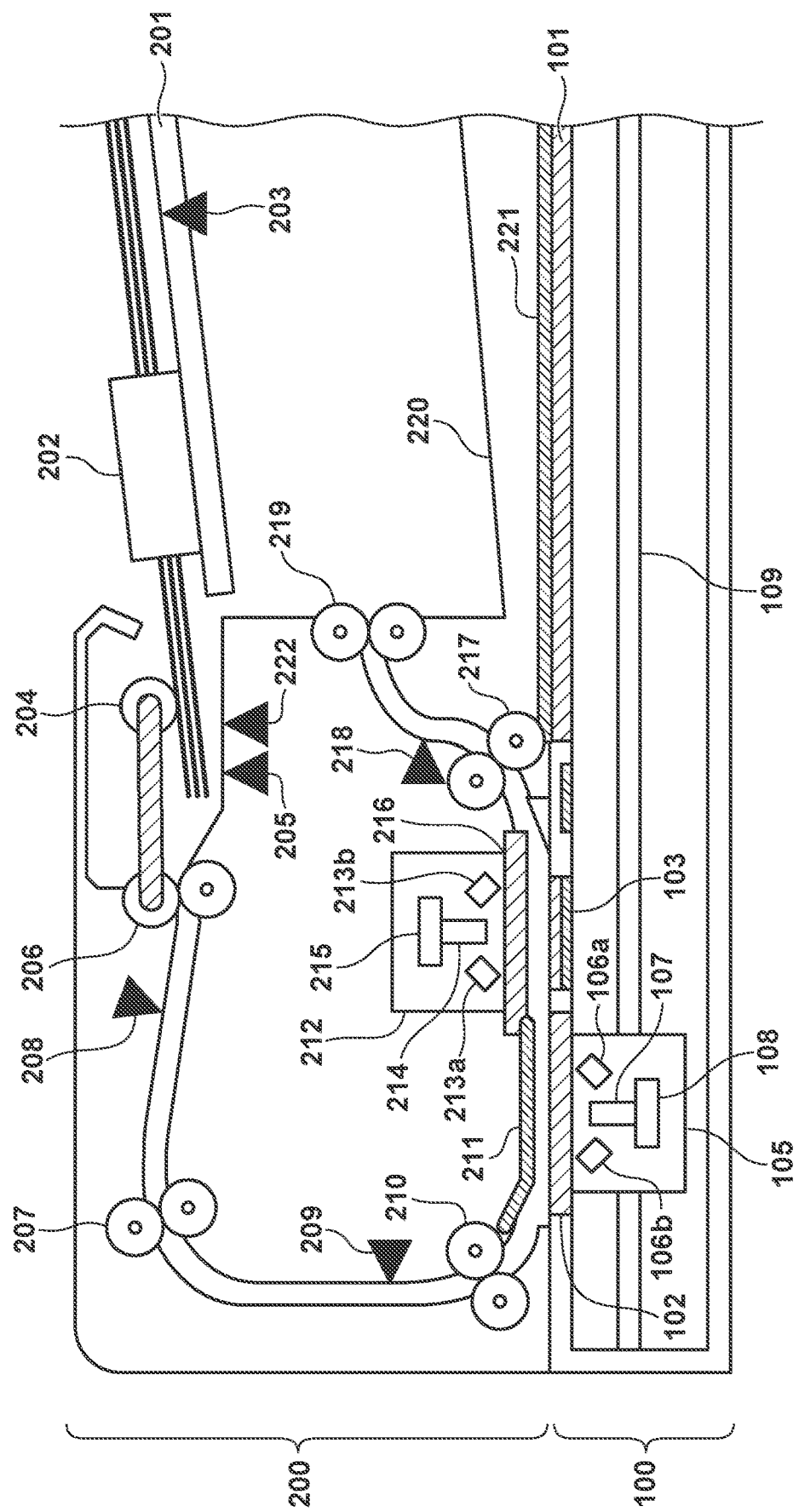
FIG. 2 is a sectional view for explaining the image reading mechanism of the original reading apparatus according to the embodiment.

FIG. 2 is a sectional view for explaining the original reading mechanism of the original reading apparatus 1. The reading unit 100 includes a glass table 101, flow scanning glass 102, and a white member 103 on the upper surface of the reading unit 100. The reading unit 100 also includes a guide rail 109 extended below and parallel to the glass table 101 in the left-and-right direction in FIG. 2, and a first reading module 105 installed on the guide rail 109. The first reading module 105 can move along the guide rail 109 by being driven by an optical unit motor 306 not shown in FIG. 2.

As original reading operations, the original reading apparatus 1 can operate in both platen reading for reading an original placed on the glass table 101, and flow scanning for reading an original conveyed by the ADF 200. In the platen reading, the first reading module 105 reads the lower face of an original placed on the glass table 101 line by line while moving along the guide rail 109. In the flow scanning, the first reading module 105 is standing still below the flow scanning glass 102 and reads the lower face of an original conveyed onto the flow scanning glass 102 by the ADF 200.

The ADF 200 includes an original tray 201, a tray guide 202, a pick-up roller 204, and a separation roller pair 206. An original is placed on the original tray 201. The tray guide 202 regulates the position in the widthwise direction (perpendicular to the conveyance direction) of the original placed on the original tray 201. The pick-up roller 204 is a roller for feeding the original placed on the original tray 201. The separation roller pair 206 includes a feed roller (also called an upper separation roller) and a retard roller (also called a lower separation roller). The separation roller pair 206 including the feed roller and the retard roller separates a plurality of originals fed by the pick-up roller 204 by using a separating nip, so that the originals fed by the pick-up roller 204 are supplied one by one to the conveyance path. The ADF 200 further includes a conveyance motor 307 and a separation clutch 308 not shown in FIG. 2. The conveyance motor 307 generates a driving force for rotating the pick-up roller 204, the separation roller pair 206, a conveyance roller pair 207, a read upstream roller pair 210, a read downstream roller pair 217, and a discharge roller pair 219. When starting the conveyance of originals, the separation clutch 308 transmits the driving force of the conveyance motor 307 to the pick-up roller 204 and the separation roller pair 206, and brings the pick-up roller 204 into contact with the upper face of a batch of originals. Consequently, the pick-up roller 204 feeds one original from the batch of originals. The pick-up roller 204 rotates clockwise in FIG. 2 by receiving the driving force of the conveyance motor 307. The separation roller pair 206 similarly rotates by receiving the driving force of the conveyance motor 307. Note that the retard roller is an example of a separating member.

The ADF 200 further includes the conveyance roller pair 207, the read upstream roller pair 210, a white member 211, and flow scanning glass 216 arranged in order from the upstream side to the downstream side along the conveyance path. Also, the ADF 200 includes a second reading module 212 installed above the flow scanning glass 216.

The conveyance roller pair 207 conveys an original separated from a batch of originals by the separation roller pair 206, to the downstream side along the conveyance path. The separation clutch 308 shuts off the transmission of the driving force of the conveyance motor 307 to the pick-up roller 204 and the separation roller pair 206, in accordance with the timing at which the leading end of the original reaches the conveyance roller pair 207, thereby stopping these rollers. This temporarily stops the entrance of a next original into the conveyance path. Note that the timing at which the leading end of an original reaches the conveyance roller pair 207 may be set at the timing after the elapse of a predetermined time from the timing at which the separation sensor 208 detects the leading end of the original. The predetermined time may be set based on the conveyance speed of an original and the distance from the separation sensor 208 to the conveyance roller pair 207.

When the trailing end of the original passes the separation sensor 208, the separation clutch 308 starts the transmission of the driving force of the conveyance motor 307 to the pick-up roller 204 and the separation roller pair 206 (the feed roller). Accordingly, the feed of the next original to the conveyance path is started.

The read upstream roller pair 210 supplies the original conveyed from the conveyance roller pair 207 to a lower face reading section and an upper face reading section of the conveyance path. The white member 211 is positioned above the lower face reading section, and the flow scanning glass 102 of the reading unit 100 is positioned below the lower face reading section. The flow scanning glass 216 is positioned above the upper face reading section, and the white member 103 of the reading unit 100 is positioned below the upper face reading section. When passing the lower face reading section, the original is irradiated with light by a first pair of LEDs 106a and 106b of the first reading module 105. In the first reading module 105, a first line sensor 108 optically reads the reflected light from this original via a first lens array 107. In the case of double-face reading, the original having undergone the above-described reading (reading of the obverse face) in the lower face reading section is irradiated with light by a second pair of LEDs 213a and 213b of the second reading module 212 when passing the upper face reading section. In the second reading module 212, a second line sensor 215 optically reads (reading of the reverse face) the reflected light from the original via a second lens array 214.

The ADF 200 further includes the read downstream roller pair 217, the discharge roller pair 219, a discharge tray 220, and a white member 221. The read downstream roller pair 217 is positioned downstream of the upper face reading section and conveys the read original along the conveyance path. The discharge roller pair 219 discharges the original conveyed from the read downstream roller pair 217 to the discharge tray 220 at the end point of the conveyance path. When performing platen reading, the while member 221 reflects light emitted from the first reading module 105.

Note that in the first and second reading modules 105 and 212, a reduction optical system including a set of a lens and a mirror may be adopted instead of the direct optical system as shown in FIG. 2. Note also that the example in which the original reading apparatus 1 can operate in both platen reading and flow scanning has been explained in this embodiment, but the technique according to this disclosure is also applicable to an apparatus that operates in only flow scanning.

Figure 3:
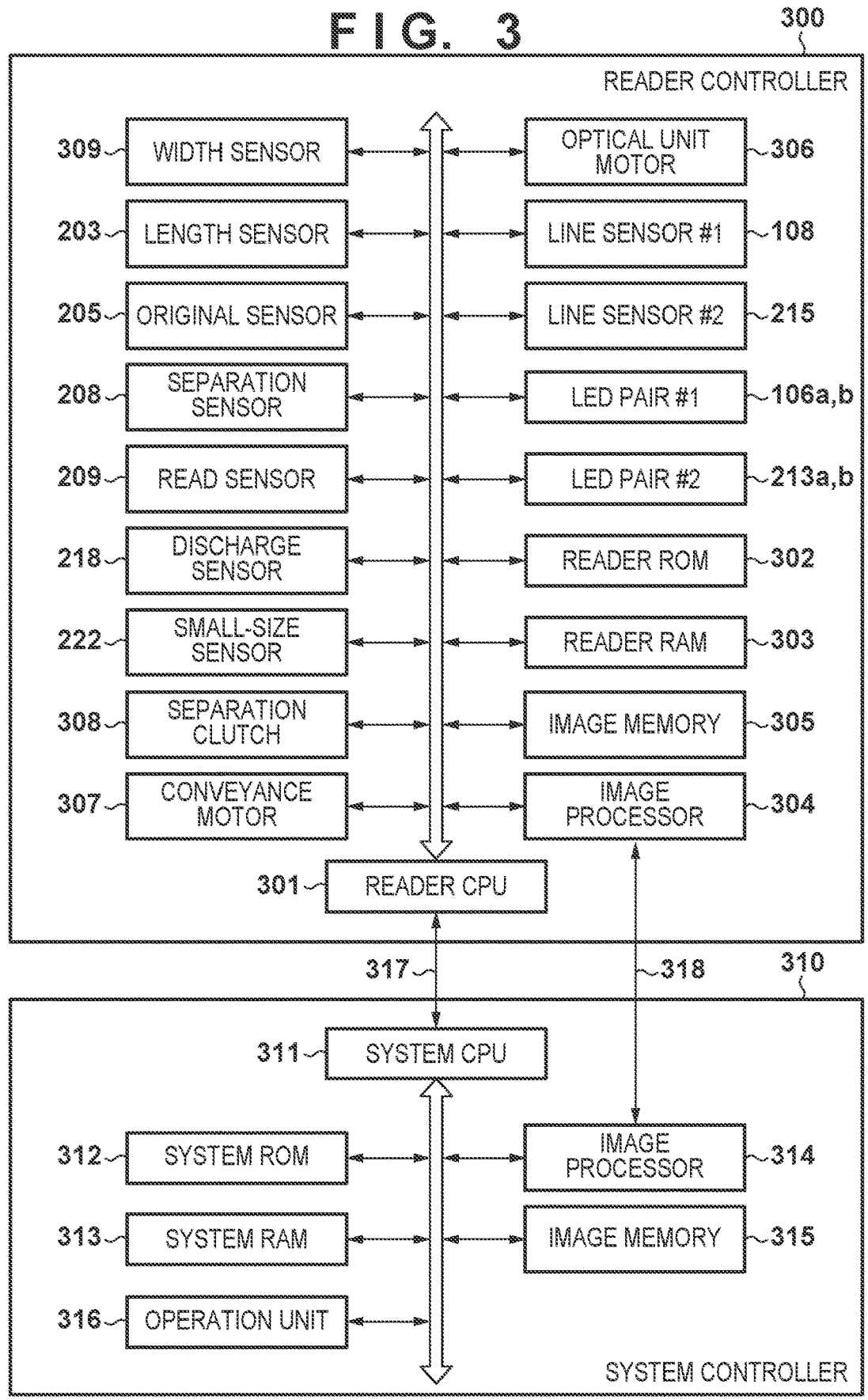
FIG. 3 is a block diagram showing an example of the configuration of a control function of the original reading apparatus according to the embodiment.
Figure 4:
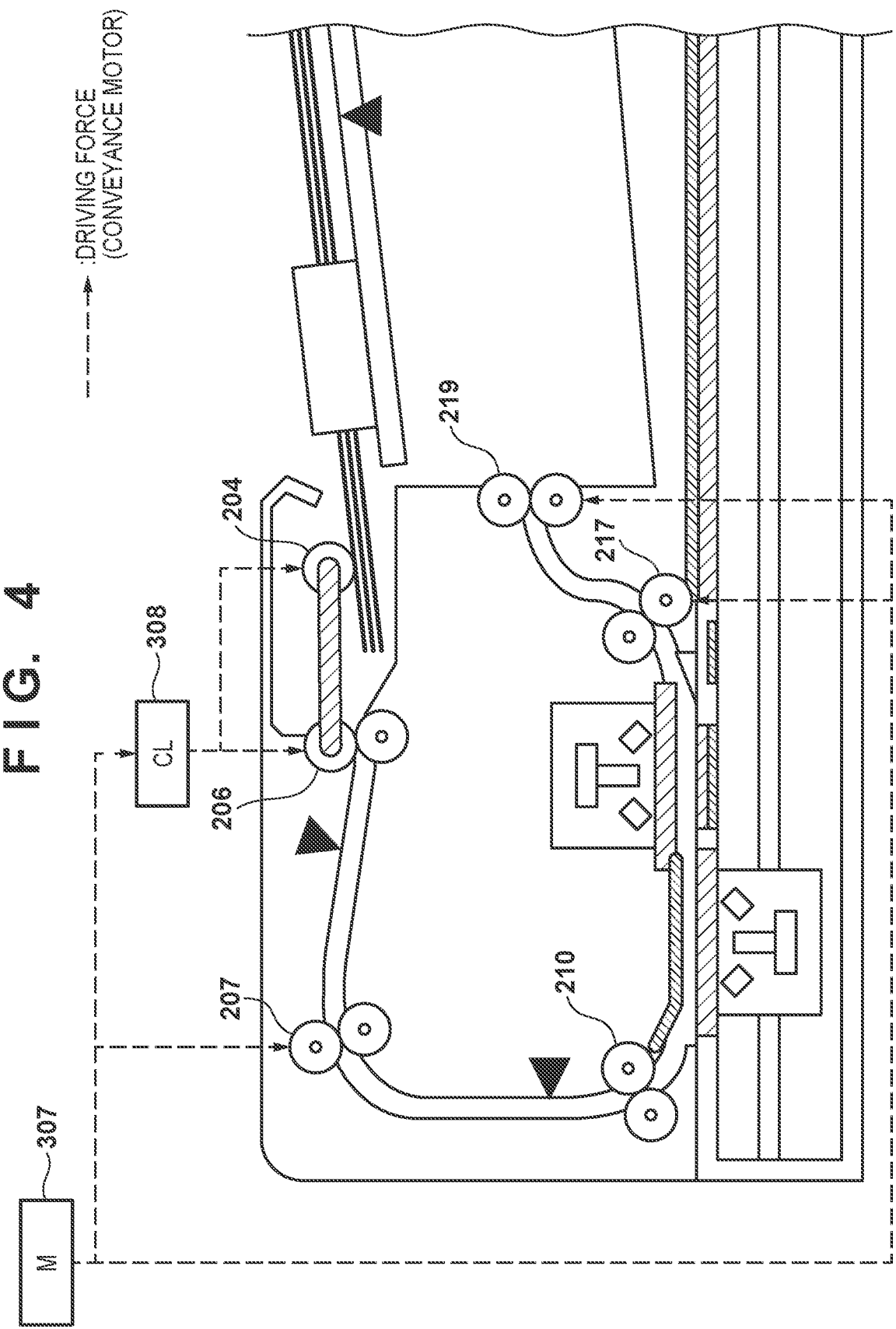
FIG. 4 is a driving configuration view showing the connection relationship between rollers, a motor, and a clutch of the original reading apparatus according to the embodiment.

FIG. 3 is a block diagram showing an example of the configuration of the control function of the original reading apparatus 1 according to this embodiment. In this example shown in FIG. 3, the control function of the original reading apparatus 1 is provided by a reader controller 300 and a system controller 310. FIG. 4 is a driving configuration view showing the connection relationship between the rollers, the motor, and the clutch of the original reading apparatus 1 according to this embodiment.

The reader controller 300 includes a reader CPU 301, a reader ROM 302, and a reader RAM 303. The reader CPU (Central Processing Unit) 301 is a processor that controls overall functionalities of the reader controller 300. The reader ROM (Read Only Memory) 302 is a nonvolatile memory and stores a control program for the control function of the reader controller 300. The reader RAM (Random Access Memory) 303 is a so-called main memory and provides the reader CPU 301 with a temporary storage area for work. The reader CPU 301 loads the control program prestored in the reader ROM 302 onto the reader RAM 303, and executes the program.

As shown in FIG. 4, the conveyance motor 307 drives the pick-up roller 204, the separation roller pair 206, the conveyance roller pair 207, the read upstream roller pair 210, the read downstream roller pair 217, and the discharge roller pair 219 of the original reading apparatus 1. The size and cost of the original reading apparatus 1 can be reduced by thus adopting a one-motor system in which a single motor drives all rollers for conveying originals. The separation clutch 308 as a transmitting unit can turn on and off the transmission of the driving force from the conveyance motor 307 to the pick-up roller 204 and the separation roller pair 206. The conveyance roller pair 207, the read upstream roller pair 210, the read downstream roller pair 217, and the discharge roller pair 219 may be connected directly to the conveyance motor 307, and are rotated in synchronization with the rotation of the conveyance motor 307.

Referring to FIG. 3 again, the reader CPU 301 is connected to an optical unit motor 306, the conveyance motor 307, and the separation clutch 308 described above. The conveyance motor 307 is, for example, a pulse motor, and the reader CPU 301 controls the rotation amount of the conveyance motor 307 to a desired value by controlling the number of driving pulses to be output to the conveyance motor 307. The number of driving pulses influences a distance (also called a conveyance distance) by which an original to be conveyed advances. Accordingly, the reader CPU 301 can measure the conveyance distance of an original by counting driving pulses output to the conveyance motor 307.

The reader CPU 301 is further connected to a width sensor 309, a length sensor 203, an original sensor 205, a separation sensor 208, a read sensor 209, a discharge sensor 218, and a small-size sensor 222. The width sensor 309 is mounted on the original tray 201, and detects the length in the widthwise direction of an original regulated by the tray guide 202. The length sensor 203 detects the length in the conveyance direction (a sub-scanning direction during reading) of an original placed on the original tray 201. The original sensor 205 detects the presence or absence of an original placed on the original tray 201. The separation sensor 208 is installed between the separation roller pair 206 and the conveyance roller pair 207 on the conveyance path, and detects the leading end and trailing end of an original to be conveyed. The read sensor 209 is installed between the conveyance roller pair 207 and the read upstream roller pair 210, and detects the leading end and trailing end of an original that enters the lower face reading section. The discharge sensor 218 is installed between the read downstream roller pair 217 and the discharge roller pair 219 on the conveyance path, and detects an original discharged by the discharge roller pair 219. The small-size sensor 222 is used to detect that a small-sized original is placed on the original tray 201, as will be explained later with reference to FIGS. 8A to 8D.

The reader CPU 301 is further connected to the first line sensor 108, the second line sensor 215, the pair of first LEDs 106a and 106b, the pair of second LEDs 213a and 213b, an image processor 304, and an image memory 305. The image processor 304 performs image processing such as noise removal on read image data of an original read by the first line sensor 108, and stores the processed read image data in the image memory 305, under the control of the reader CPU 301. The reader CPU 301 outputs the read image data stored in the image memory 305 to the system controller 310 via an image data bus 318, in accordance with an image output request received from the system controller 310 via a command data bus 317. Also, the reader CPU 301 supplies a vertical sync signal and a horizontal sync signal to the system controller 310 via the image data bus 318, in synchronization with the timing of original reading. The system controller 310 refers to the vertical sync signal as a reference of the output timing of the head of the read image data, and to the horizontal sync signal as a reference of the output timing of the head of each line.

The system controller 310 includes a system CPU 311, a system ROM 312, a system RAM 313, an image processor 314, an image memory 315, and an operation unit 316. The system CPU 311 is a processor for controlling overall functionalities of the system controller 310. For example, the system CPU 311 exchanges commands and data for controlling original reading in the original reading apparatus 1 with the reader CPU 301, via the command data bus 317. The system ROM 312 is a nonvolatile memory, and stores a control program for the control function of the system controller 310. The system RAM 313 is a so-called main memory, and provides the system CPU 311 with a temporary storage area for work. The system CPU 311 loads the control program prestored in the system ROM 312 onto the system RAM 313, and executes the control program.

The image processor 314 obtains the read image data from the image processor 304 of the reader controller 300 via the image data bus 318, under the control of the system CPU 311. The image processor 314 performs image processing such as resolution conversion and color component reduction (to be explained later) on the obtained read image data, and stores the processed read image data in the image memory 315. The operation unit 316 is a unit that provides a user interface for accepting instructions and information inputting from the user, and presenting images and information to the user. The operation unit 316 can include one or more of, for example, a touch sensor, a button, a switch, a keypad, a display, a microphone, and a speaker.

In this embodiment, the original reading apparatus 1 is capable of operating in at least two operation modes including a high-quality mode and a low-quality mode. The high-quality mode corresponds to a relatively high reading quality, and the low-quality mode corresponds to a relatively low reading quality. The operation unit 316 allows the user to select one of these operation modes via the user interface (for example, a setting menu displayed on the screen), and notifies the system CPU 311 of the operation mode selected by the user. The system CPU 311 notifies the reader CPU 301 of the selected operation mode. Based on the notified selected operation mode, the reader CPU 301 controls the rotation of each roller driven by the conveyance motor 307.

In this embodiment, quality of a read image may include reading resolution. That is, the reading quality in the high-quality mode can correspond to a higher reading resolution, and the reading quality in the low-quality mode can correspond to a lower reading resolution. Generally, flow scanning requires an original to be conveyed at a lower speed in order to obtain an image having a higher reading resolution. When the selected operation mode is the high-quality mode, therefore, the reader CPU 301 rotates the conveyance motor 307 at a speed lower than that when the selected operation mode is the low-quality mode. Additionally or alternatively, quality of a read image may include the number of color components. For example, the reading quality in the high-quality mode can correspond to a full-color mode having a larger number of color components, and the reading quality in the low-quality mode can correspond to a monochrome mode having a smaller number of color components. Even in this case, if the selected operation mode is the high-quality mode, the reader CPU 301 rotates the conveyance motor 307 at a speed lower than that when the selected operation mode is the low-quality mode.

2. Explanation of Issues

When conveying a small-sized original, such as a card (for example, a name card), having a relatively short original length in the conveyance direction by using the ADF 200, the trailing end of the original separates from the pick-up roller 204 earlier than when conveying a large-sized original having a relatively long original length in the conveyance direction. As a consequence, the pick-up roller 204 comes in contact with a next original and feeds the next original. This phenomenon is called overlapped conveyance. For example, if the leading end of the next original reaches the separation sensor 208 due to this overlapped conveyance, the separation sensor 208 cannot correctly detect the trailing end of the preceding original, and this makes it difficult to accurately advance the feeding of the next original.

Figure 5:
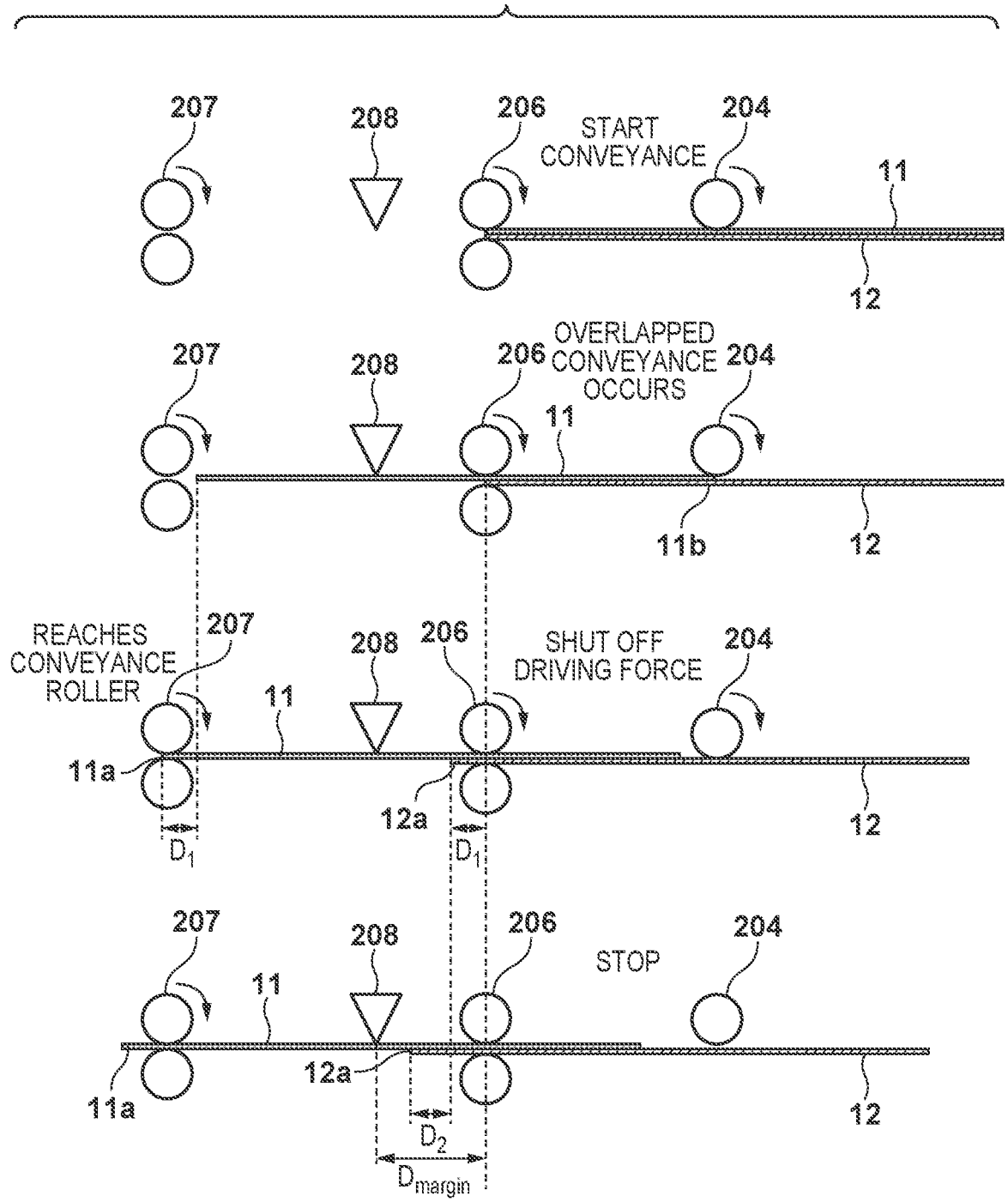
FIG. 5 is a view for explaining an example of overlapped conveyance of large-sized originals.
Figure 6:
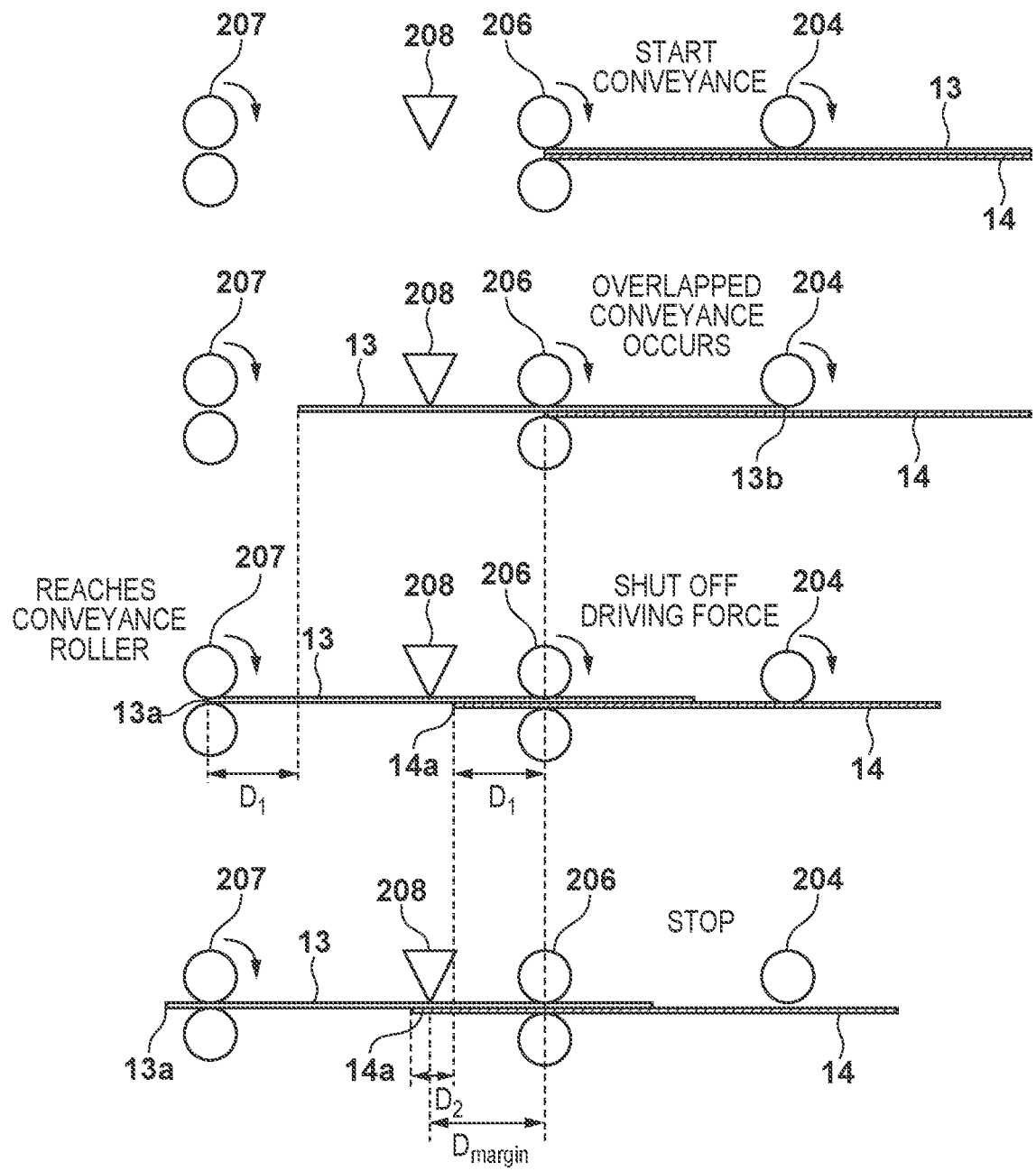
FIG. 6 is a view for explaining an example of overlapped conveyance of small-sized originals.

FIG. 5 is a view for explaining an example of the overlapped conveyance of a large-sized original (for example, A5 or a postcard). FIG. 6 is a view for explaining an example of the overlapped conveyance of a small-sized original (for example, a name card).

FIG. 5 shows the pick-up roller 204, the separation roller pair 206, the separation sensor 208, and the conveyance roller pair 207 from the right to the left. The conveyance path starts from the separation roller pair 206 and extends to the left in FIG. 5. At the time of conveyance start, as shown in the first stage of FIG. 5, a batch of an original 11 and a next original 12 is set such that the leading end is aligned with the separation roller pair 206. The size of the original 11 and the next original 12 is larger than that of originals shown in FIG. 6.

Upon receiving an original read instruction, the reader CPU 301 causes the conveyance motor 307 to generate a driving force, and causes the separation clutch 308 to transmit the driving force of the conveyance motor 307 to the pick-up roller 204 and the separation roller pair 206. Consequently, the pick-up roller 204 comes in contact with the original 11 while rotating, and feeds the original 11. The original 11 enters the conveyance path, and is conveyed by the pick-up roller 204 and the separation roller pair 206. Then, as shown in the second stage of FIG. 5, a trailing end 11b of the original 11 separates from the pick-up roller 204. Accordingly, the pick-up roller 204 comes in contact with the next original 12 and feeds the next original 12. That is, overlapped conveyance occurs from this point of time.

After that, as shown in the third stage of FIG. 5, a leading end 11a of the original 11 reaches the conveyance roller pair 207. The reader CPU 301 counts driving pulses output to the conveyance motor 307 from the point of time at which, for example, the leading end 11a of the original 11 is detected by the separation sensor 208. Then, when the counter value becomes a value corresponding to the distance between the separation sensor 208 and the conveyance roller pair 207, the reader CPU 301 can determine that the leading end 11a of the original 11 has reached the conveyance roller pair 207. The original 11 has advanced a distance $D_1$ from the point of time of the second stage to the point of time of the third stage in FIG. 5. Since the original 11 and the next original 12 are conveyed by the rollers rotated by the same driving force of the conveyance motor 307, the next original 12 has advanced the same distance $D_1$.

After the point of time of the third state in FIG. 5, the original 11 is conveyed by the conveyance roller pair 207. Therefore, when the leading end 11a of the original 11 has reached the conveyance roller pair 207, the reader CPU 301 causes the separation clutch 308 to shut off the transmission of the driving force of the conveyance motor 307 to the pick-up roller 204 and the separation roller pair 206. However, the rotations of the pick-up roller 204 and the separation roller pair 206 do not stop immediately.

After the roller suspension delay determined by the mechanical structures and the characteristics, the rotations of the pick-up roller 204 and the separation roller pair 206 completely stop as shown in the fourth stage of FIG. 5. During this roller suspension delay, the next original 12 advances a distance $D_2$ by being conveyed by the pick-up roller 204 and the separation roller pair 206. Consequently, the overlapped conveyance amount of the next original 12 reaches a distance $D_1+D_2$. In this example shown in FIG. 5, however, the sum $D_1+D_2$ of the distances does not reach a distance $D_{margin}$ from the separation roller pair 206 to the separation sensor 208. Therefore, after the original 11 is further conveyed by the conveyance roller pair 207, the separation sensor 208 can correctly detect the trailing end of the original 11. This means that the feeding of the next original 12 can be started.

When the separation sensor 208 has detected the trailing end of the original 11, the reader CPU 301 causes the separation clutch 208 to resume the transmission of the driving force of the conveyance motor 307 to the pick-up roller 204 and the separation roller pair 206. Consequently, the original 11 and the next original 12 are conveyed in order at an appropriate interval.

The distance $D_1$ shown in FIG. 5 can be equal to, for example, a length obtained by subtracting the size of the original from the distance between the pick-up roller 204 and the conveyance roller pair 207. Accordingly, the distance $D_1$ increases as the size of the original decreases.

FIG. 6 similarly shows the pick-up roller 204, the separation roller pair 206, the separation sensor 208, and the conveyance roller pair 207 from the right to the left. At the point of time of conveyance start, as shown in the first stage of FIG. 6, a batch of an original 13 and a next original 14 is set such that the leading end is aligned with the separation roller pair 206. The size of the original 13 and the next original 14 is smaller (shorter in the conveyance direction) than that of the originals shown in FIG. 5.

At the start of conveyance, as in the example shown in FIG. 5, the pick-up roller 204 comes in contact with the original 13 while rotating, and feeds the original 13, by receiving the driving force of the conveyance motor 307 via the separation clutch 308 (see the first stage in FIG. 6). The original 13 enters the conveyance path and is conveyed by the separation roller pair 206. Then, a trailing end 13b of the original 13 separates from the pick-up roller 204 (see the second stage in FIG. 6). After that, the pick-up roller 204 comes in contact with the next original 14 and feeds the next original 14. The original 13 is continuously conveyed by the separation roller pair 206, and the next original 14 is also conveyed by the pick-up roller 204.

At the point of time shown in the third stage of FIG. 6, a leading end 13a of the original 13 reaches the conveyance roller pair 207. Based on the counter value of the driving pulses output to the conveyance motor 307, the reader CPU 301 determines that the leading end 13a of the original 13 has reached the conveyance roller pair 207. The original 13 and the next original 14 have advanced the distance $D_1$ from the point of time of the second stage to the point of time of the third stage in FIG. 6. In the case shown in FIG. 6, however, the distance $D_1$ is larger than that in the case shown in FIG. 5.

When the leading end 13a of the original 13 has reached the conveyance roller pair 207, the reader CPU 301 causes the separation clutch 308 to shut off the transmission of the driving force to the pick-up roller 204 and the separation roller pair 206. The roller suspension delay of the pick-up roller 204 and the separation roller pair 206 remains the same regardless of the size of the original. After the roller suspension delay, as shown in the fourth stage of FIG. 6, the rotations of the pick-up roller 204 and the separation roller pair 206 completely stop. During this roller suspension delay, the next original 14 advances the distance $D_2$. In the cases shown in FIGS. 5 and 6, the distance $D_2$ remains unchanged if the conveyance speeds are the same. The overlapped conveyance amount of the next original 14 reaches the distance $D_1+D_2$. In this example shown in FIG. 6, the sum $D_1+D_2$ of the distances exceeds the distance $D_{margin}$ from the separation roller pair 206 to the separation sensor 208. Even when the trailing end of the original 13 passes the separation sensor 208, therefore, the separation sensor 208 cannot correctly detect the passage of the trailing end of the original 13 because the separation sensor 208 detects the next original 14. That is, the feeding of the next original 14 cannot be started.

The distance $D_2$ in FIGS. 5 and 6 is the distance at which the next original 12 advances during the roller suspension delay. The distance $D_2$ is longer when the rotation speed of the rollers is higher, that is, when the conveyance speed of the originals is higher, at the time of shut-off of the transmission of the driving force to the rollers. Therefore, in order to prevent the interruption of accurate original separation due to overlapped conveyance, a possible solution is to shorten the distance $D_2$ by decreasing the original conveyance speed. When the distance $D_2$ is shortened, it is expected that the leading end of a small-sized original can be prevented from reaching the separation sensor 208 before the pick-up roller 204 and the separation roller pair 206 completely stop.

The original conveyance speed usually has a tradeoff relationship with the productivity. Especially in the case of the original reading apparatus 1 using the one-motor system, the speed of an original passing the reading section during flow scanning is equal to the conveyance speed if the roller radii are the same. As described above, the speed of an original passing the reading section influences the reading quality of the original in the reading section. For example, consider a case where a user who takes precedence of productivity sets the low-quality mode. If the separation between originals fails because of the set original size being small, the productivity will decrease contrary to the user's intention. On the other hand, uniformly suppressing the original conveyance speed would lead to giving up the opportunity for improving the productivity when reading an original having a larger size with which overlapped conveyance poses practically no problem.

3. Details of Conveyance Control

The conveyance control of the present embodiment will now be described.

(1) When Flow-Scanning Large-Sized Original

When the size of a set original is a large size and the selected operation mode is the high-quality mode, the reader CPU 301 rotates the conveyance motor 307 at a first rotation speed. When the size of a set original is a large size and the selected operation mode is the low-quality mode, the reader CPU 301 rotates the conveyance motor 307 at a second rotation speed higher than the first rotation speed.

(2) When Flow-Scanning Small-Sized Original

When the size of a set original is a small size, the reader CPU 301 rotates the conveyance motor 307 at a third rotation speed lower than the second rotation speed, regardless of whether the selected operation mode is the high-quality mode or the low-quality mode. Note that in this embodiment, the third rotation speed is equal to the first rotation speed.

Note that the terms "large size" and "small size" refer to the relative relationship between original sizes, and do not limit absolute sizes of originals to which the technique according to this disclosure is applicable. As mere examples, a large-sized original can be a high-use-frequency size (also called a normal size) such as A4 or B5, and a small-sized original can be a name-card-size original.

The small size can be a size for which the original length in the conveyance direction is shorter than the length from the pick-up roller 204 to a position of the preceding original at the timing at which the transmission of the driving force of the conveyance motor 307 to the pick-up roller 204 and the separation roller pair 206 is shut off. Note that in this embodiment, the timing at which the transmission of the driving force of the conveyance motor 307 to the pick-up roller 204 and the separation roller pair 206 is shut off corresponds to the timing at which the leading end of a preceding original reaches the conveyance roller pair 207. In this embodiment, the small-sized original is an original whose original length in the conveyance direction is shorter than the distance from the original contact position of the pick-up roller 204 to the conveyance roller pair 207.

When flow-scanning the small-sized original in this embodiment, the conveyance motor 307 is driven at the third rotation speed regardless of whether the reading mode is the high-quality mode or the low-quality mode. As a consequence, the distance at which the small-sized original is conveyed during the suspension delay of the pick-up roller 204 and the separation roller pair 206 becomes shorter than that when driving the conveyance motor 307 at the second rotation speed. This makes it possible to prevent a next original following the preceding small-sized original from reaching the separation sensor 208.

FIG. 7A shows an example of relationship between possible conveyance speeds that can be selected by the reader CPU 301 when it uses the conveyance motor 307 to control the conveyance speed, and corresponding reading quality. In this example shown in FIG. 7A, four modes M1, M2, M3, and M4 can be selected as a control mode for the conveyance speed. In the control mode M1, the conveyance speed is V1 as the lowest speed. When conveying an original at the conveyance speed V1, each reading module can read the original by full color and at a high resolution (for example, 600 dpi) in both the main scanning direction and the sub scanning direction. In the control mode M2, the conveyance speed is V2 as a medium speed. When conveying an original at the conveyance speed V2, each reading module can read the original by full color, at a low resolution (for example, 300 dpi) in the main scanning direction, and at a high resolution in the sub scanning direction. In the control modes M3 and M4, the conveyance speed is V3 as the highest speed. In the control mode M3, each reading module reads an original by full color and at a low resolution in both the main and sub scanning directions. In the control mode M4, each reading module reads an original by monochrome and at a high resolution in both the main and sub scanning directions.

Actual values of the conveyance speeds V1, V2, and V3 can be determined from the performance (for example, the reading time per line) of reading and movement of a reading module, and from the required main and sub scanning resolutions. In particular, the conveyance speed V1 is a speed at which the leading end of a subsequent one of small-sized originals does not reach the separation sensor 208 during the roller suspension delay of the pick-up roller 204 and the separation roller pair 206. On the other hand, the conveyance speed V3 (or V2 and V3) is a speed at which the leading end of a subsequent one of small-sized originals reaches the separation sensor 208 during the roller suspension delay.

FIG. 7B shows examples of the control mode to be selected by the reader CPU 301, for each combination of the color mode and the main/sub scanning resolutions to be selected by the user (that is, for each reading quality mode), when reading a large-sized original. For example, when the user has selected full color and 600 dpi in the both directions, the reader CPU 301 selects the control mode M1, so the original is conveyed at the conveyance speed V1. When the user has selected full color, 300 dpi in the main scanning direction, and 600 dpi in the sub scanning direction, the reader CPU 301 selects the control mode M2, so the original is conveyed at the conveyance speed V2. When the user has selected full color and 300 dpi in the both directions, the reader CPU 301 selects the control mode M3, so the original is conveyed at the conveyance speed V3. When the user has selected monochrome, the reader CPU 301 selects the control mode M4 regardless of the selection of the resolution, so the original is conveyed at the conveyance speed V3.

FIG. 7C shows examples of the control mode to be selected by the reader CPU 301, for each combination of the color mode and the main/sub scanning resolutions to be selected by the user (that is, for each reading quality mode), when reading a small-sized original. In this case, the reader CPU 301 selects the control mode M1 regardless of the reading quality selected by the user, so the original is conveyed at the conveyance speed V1 as the lowest speed.

The reader ROM 302 prestores mapping tables showing the correspondences between the reading quality, the control mode, and the conveyance speed (or the rotation speed of the conveyance motor 307) as shown in FIGS. 7A to 7C. By referring to such mapping tables, the reader CPU 301 determines the control mode corresponding to a combination of the reading quality designated by the system CPU 311 and the original size detected by the sensor. Then, the reader CPU 301 causes the conveyance motor 307 to generate a driving force in the determined control mode, and causes each reading module to read an original.

FIGS. 8A to 8D are views for explaining examples of the method of detecting the original size. Each of FIGS. 8A to 8D shows an example of the positional relationship between an original placed on the original tray 201, the tray guide 202, the length sensor 203, the original sensor 205, and the small-size sensor 222, in a form of top-down view of the ADF 200. In the first example shown in FIG. 8A, both the sensor outputs from the original sensor 205 and the small-size sensor 222 are ON, so the reader CPU 301 can determine that a large-sized original is set in the ADF 200. In the second example shown in FIG. 8B, the sensor output from the original sensor 205 is OFF and the sensor output from the small-size sensor 222 is ON, so the reader CPU 301 can determine that a small-sized original is set in the ADF 200. In the third example shown in FIG. 8C, the sensor output from the original sensor 205 is ON and the sensor output from the small-size sensor 222 is OFF, so the reader CPU 301 can determine that an original is not properly set on the original tray 201. In the fourth example shown in FIG. 8D, both the sensor outputs from the original sensor 205 and the small-size sensor 222 are OFF, so the reader CPU 301 can determine that an original is not properly set on the original tray 201. In the third and fourth examples, the reader CPU 301 need not start conveyance and reading of the original. Since the sensor configuration as described above makes it possible to automatically detect the size of an original, the reader CPU 301 can convey the original at an appropriate conveyance speed for avoiding excessive overlapped conveyance without requiring the user to explicitly designate the size of originals.

When flow-scanning a small-sized original in the low-quality mode (for example, the low-resolution mode or the monochrome mode), if the original conveyance rollers are rotated at the above-mentioned third rotation speed, high-reading-quality read image data will be obtained although the user has designated the low quality. Making this reading quality reducible by variably controlling the reading operation in the reading module would complicate the module structure and increase the cost of the apparatus. Therefore, when the size of an original is the small size and the selected operation mode is the low-quality mode, the image processor 314 may perform quality conversion on read images generated by the individual reading modules. More specifically, in the case of a small-sized original and the low-quality mode, the quality of the read image of the original that has been read while being conveyed at the conveyance speed V1 corresponding to the above-mentioned third rotation speed will be a reading quality corresponding to the high-quality mode. The image processor 314 converts this read image generated with the high reading quality into a low-reading-quality image corresponding to the low-quality mode. This conversion of the reading quality may include, for example, reduction of the resolution performed by resampling pixel values or decimating pixels of the read image data. The reading quality conversion may also include color reduction (for example, grayscaling or monochrome conversion) of full-color read image data.

4. Procedure

Figure 9A:
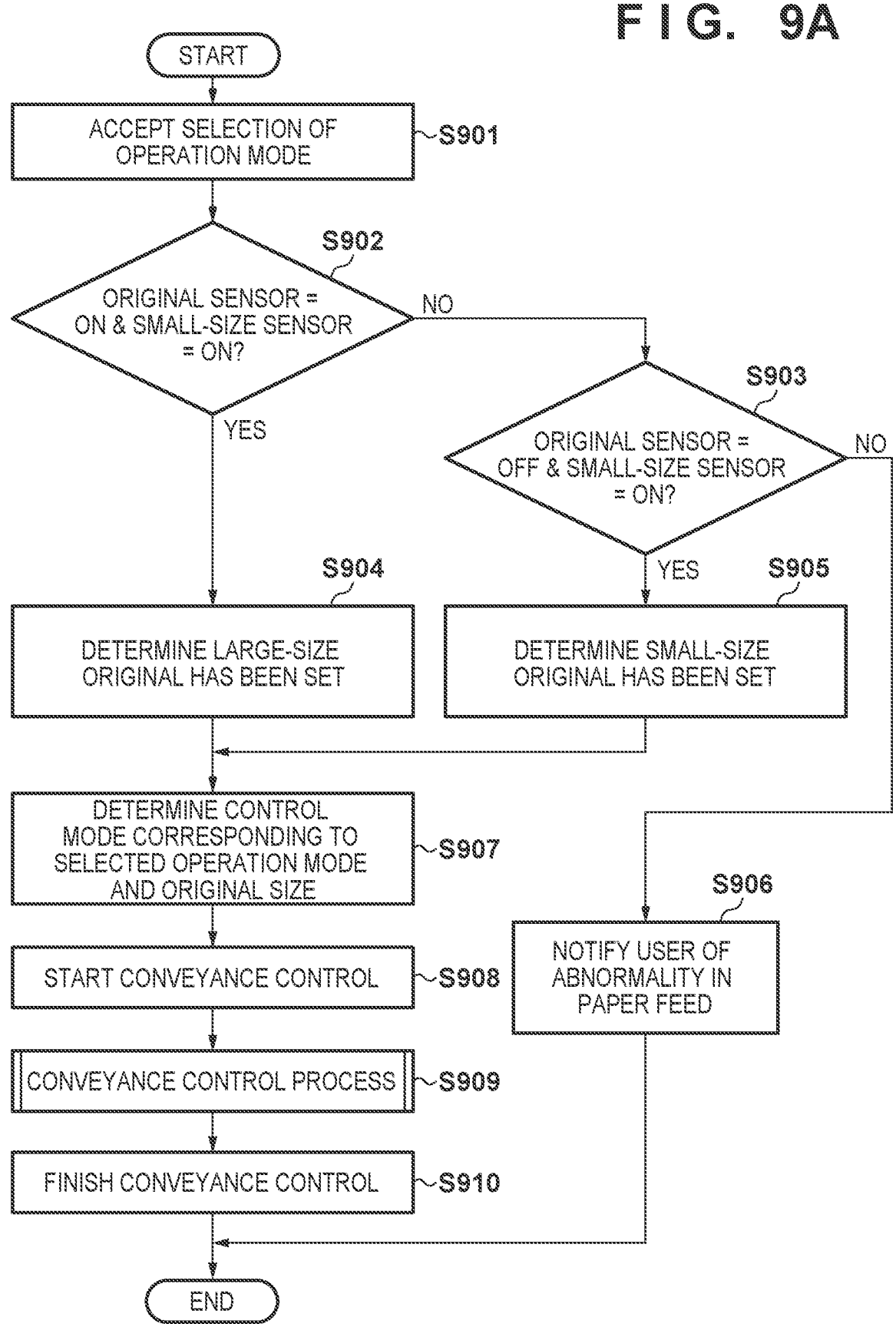
FIG. 9A is a flowchart showing an example of an outline of the procedure of a process to be executed by the original reading apparatus in the embodiment.

FIG. 9A is a flowchart showing an example of an outline of the procedure of a process to be executed by the original reading apparatus 1 in this embodiment. This process shown in FIG. 9A can be implemented by the system CPU 311 and the reader CPU 301 cooperating with each other to control respective units of the original reading apparatus 1. Note that in the following explanation, each processing step will be abbreviated as S (step).

First, in S901, the system CPU 311 accepts a selection of an operation mode by the user via the operation unit 316. For example, the user selects one of a plurality of operation modes including an operation mode corresponding to a high reading quality (for example, full color or a high resolution) and an operation mode corresponding to a low reading quality (for example, monochrome or a low resolution). The system CPU 311 notifies the reader CPU 301 of the operation mode selected by the user.

Then, in S902 and S903, the reader CPU 301 determines the size of an original placed on the original tray 201, based on the output signals from the original sensor 205 and the small-size sensor 222. For example, if both the original sensor 205 and the small-size sensor 222 have detected the original (YES in S902), the reader CPU 301 determines in S904 that a large-sized original is set. If the original sensor 205 has not detected the original and the small-size sensor 222 has detected the original (NO in S902, YES in S903), the reader CPU 301 determines in S905 that a small-sized original is set. In neither case, the reader CPU 301 notifies the user of the abnormality of paper feed in S906, and terminates the process shown in FIG. 9A.

If the size is normally detected, the process advances to S907, and the reader CPU 301 determines a control mode corresponding to a combination of the selected operation mode notified from the system CPU 311, and the original size detected by using the sensors, by referring to the correspondences explained with reference to FIGS. 7A to 7C. For example, if the detected original size is a large size, a control mode to be determined depending on the selected operation mode can be one of the modes M1, M2, M3, and M4. If the detected original size is a small size, a control mode to be determined can be the mode M1 regardless of the selected operation mode.

Subsequently, in S908, the reader CPU 301 starts conveyance control. For example, when starting conveyance control, the reader CPU 301 sets reading operation parameters in the first reading module 105 (and in the second reading module 212 in the case of double-face reading), and sets the driving force of the conveyance motor 307, based on the determined control mode. The reading operation parameters include, for example, the reading resolution and the color mode. The setting of a shading process may further be performed. The driving force of the conveyance motor 307 corresponds to the conveyance speed (for example, V1, V2, or V3) predefined in relation to the control mode determined in S907.

Then, in S909, the reader CPU 301 repeats a conveyance control process by the number of originals contained in a batch of originals. An example of a detailed procedure of this conveyance control process will be explained later.

When the reading of all originals is complete, the reader CPU 301 ends the conveyance control in S910. For example, the reader CPU 301 moves each reading module to a standby position, and stops the rotation of the conveyance motor 307. After that, the process shown in FIG. 9A ends.

Figure 9B:
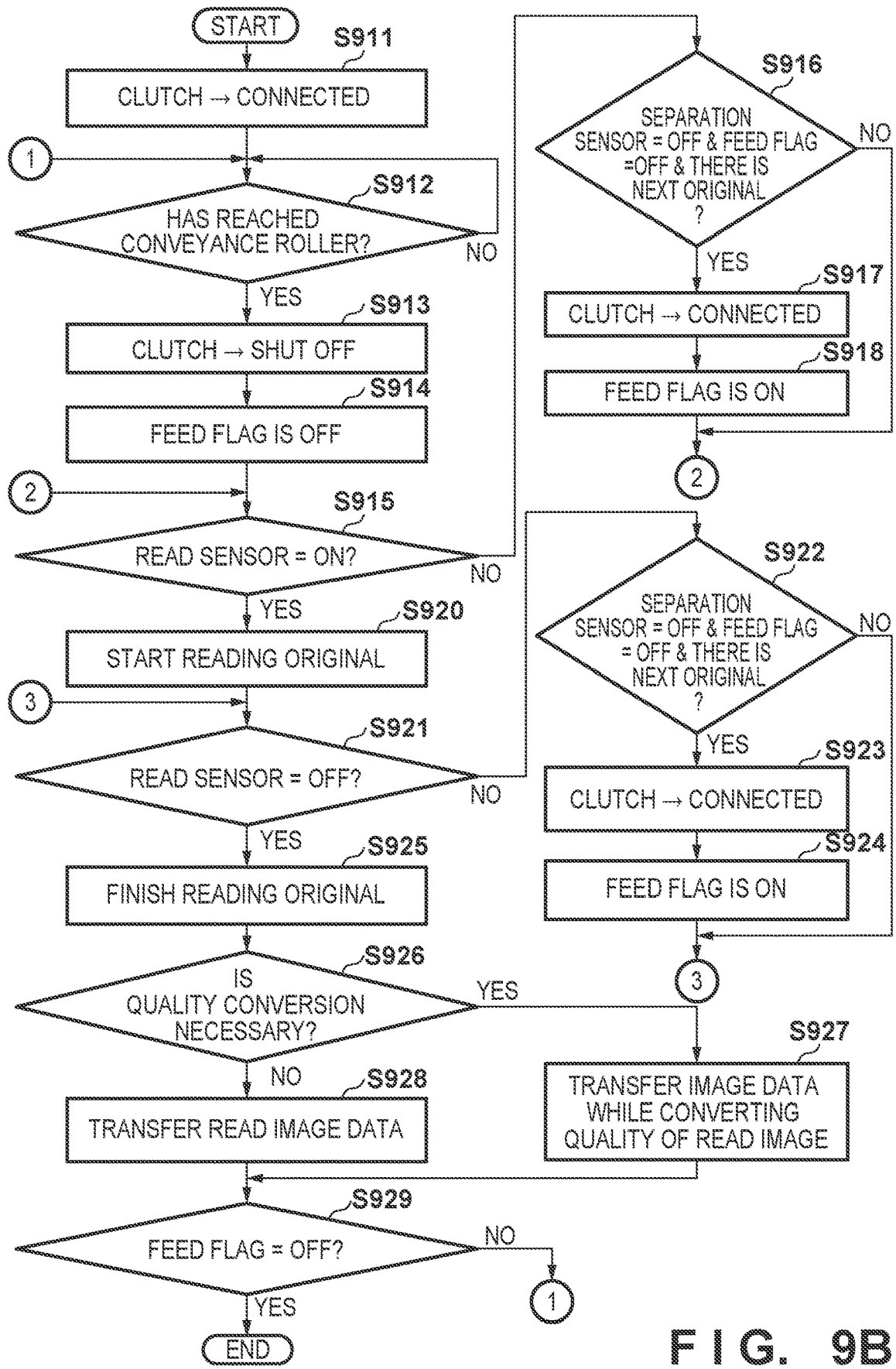
FIG. 9B is a flowchart showing an example of a detailed procedure of a conveyance control process that can be executed in the embodiment.

FIG. 9B is a flowchart showing an example of a detailed procedure of the conveyance control process that can be executed in S909 of FIG. 9A.

First, in S911, the reader CPU 301 switches the separation clutch 308 to a connected state. As a result, the pick-up roller 204 rotates by receiving the driving force of the conveyance motor 307, comes in contact with the upper face of a batch of originals, and picks up an original. The separation roller pair 206 separates the picked-up original and conveys it.

Then, in S912, the reader CPU 301 counts output pulses sent to the conveyance motor 307 after the leading end of the original has reached the separation sensor 208, thereby waiting until the leading end of the original reaches the conveyance roller pair 207. When the leading end of the original has reached the conveyance roller pair 207, the reader CPU 301 switches the separation clutch 308 to a shut-off state in S913. Also, in S914, the reader CPU 301 initializes a feed flag as a conveyance control parameter to OFF. The feed flag is a flag for controlling whether to feed a next original.

Then, in S915, the reader CPU 301 monitors an output signal from the read sensor 209, and waits until the output signal changes to ON. Before the output signal from the read sensor 209 changes to ON, in S916, the reader CPU 301 determines whether the trailing end of the original has reached the separation sensor 208, based on the output signal of the separation sensor 208. If the trailing end of the original has reached the separation sensor 208 (the output signal of the separation sensor is OFF) and the existence of a next original is detected, the reader CPU 301 switches the separation clutch 308 to the connected state in S917, and sets the feed flag to ON in S918. Accordingly, the pick-up roller 204 having stopped once rotates again by receiving the driving force of the conveyance motor 307, and picks up the next original. For example, when the length of the original in the conveyance direction is shorter than the distance between the lead sensor 209 and the separation sensor 208, the next original may be picked up in this processing branch before the leading end of the preceding original reaches the read sensor 209.

If the output signal from the read sensor 209 changes to ON, the reader CPU 301 causes each reading module to start reading the original in S920. While each reading module is reading the original, in S921, the reader CPU 301 monitors the output signal from the read sensor 209 and waits until the output signal changes to OFF. Before the output signal from the read sensor 209 changes to OFF, in S922, the reader CPU 301 determines whether the trailing end of the original has reached the separation sensor 208, based on the output signal of the separation sensor 208. Note that if the trailing end of the original has already reached the separation sensor 208 in S916, the processing step of this processing branch can be skipped. If the trailing end of the original has reached the separation sensor 208 (the output signal of the separation sensor is OFF) and the existence of the next original is detected, the reader CPU 301 switches the separation clutch 308 to the connected state in S923, and sets the feed flag to ON in S924. For example, when the length of the original in the conveyance direction is equal to or longer than the distance between the lead sensor 209 and the separation sensor 208, the next original can be picked up in this processing branch after the leading end of the preceding original has reached the lead sensor 209.

If the output signal from the read sensor 209 changes to OFF, the reader CPU 301 causes each reading module to finish reading the original in S925. Then, in S926, the reader CPU 301 determines whether quality conversion is necessary for the read image, based on the selected operation mode notified from the system CPU 311 and the determined control mode. For example, when the size of the original is a small size and the selected operation mode is the low-quality mode, it can be determined that the quality of the read image of the original needs to be converted, for example, from the high resolution to the low resolution or from full color to monochrome. If it is determined that the quality conversion is necessary, the process advances to S927. On the other hand, if it is determined that the quality conversion is unnecessary, the process advances to S928.

In S927, the reader CPU 301 outputs read image data stored in the image memory 305 to the system controller 310 via the image data bus 318. The image processor 314 of the system controller 310 converts the quality of the read image data input from the reader controller 300, and stores the converted read image data in the image memory 315. On the other hand, in S928, the reader CPU 301 outputs the read image data stored in the image memory 305 to the system controller 310 via the image data bus 318. The image processor 314 of the system controller 310 stores the read image data input from the reader controller 300 in the image memory 315 without converting the quality of the data.

Subsequently, in S929, the reader CPU 301 determines whether the feed flag is OFF. If the feed flag is ON, a next original exists, so the process returns to S912, and the above-described conveyance control process is repeated. If the feed flag is OFF, the conveyance control process shown in FIG. 9B ends. The original having reached the end point of the conveyance path is discharged to the discharge tray 220.

5. Comparison with Another Approach

In this section, a difference in productivity between the above-described embodiment and an alternative approach as a comparative example will be examined by focusing attention on a case in which a small-sized original is read when the user has selected the low-quality mode.

FIG. 10A is a timing chart showing the timing at which the feed of a second small-sized original following a first small-sized original is started in the above-described embodiment. FIG. 10B shows the positional relationship between the originals at time $T_2$ in the timing chart of FIG. 10A.

In the above-described embodiment as shown in FIG. 10A, the separation clutch 308 switches from the shut-off state to the connected state at time $T_2$ at which the separation sensor 208 detects the trailing end of a first original 15. At this time, there is the possibility that a second original 16 has already advanced to some extent due to overlapped conveyance, but the second original 16 is conveyed to the downstream side of the conveyance path in a state in which second original 16 is appropriately separated from the first original 15. The original conveyance rollers rotate at a constant rotation speed (corresponding to a low conveyance speed), and the first original 15 can be read in each reading section while the second original 16 is advancing on the conveyance path.

An alternative approach may be considered in which, instead of rotating the original conveyance rollers at a constant low rotation speed, the rotation speed of the rollers is raised when an original passes each reading section. In this case, the conveyance speed of an original in each reading section increases, and the reading quality of the original decreases accordingly. This obviates the need to convert the quality of a read image of a small-sized original in accordance with the low-quality mode. However, if the roller rotation speed is raised in a one-motor system, excessive overlapped conveyance explained with reference to FIG. 6 occurs. In this approach, therefore, overlapped conveyance must be avoided by adopting an arrangement in which the conveyance of a second original is resumed after detecting completion of reading of a first original.

Figure 11A:
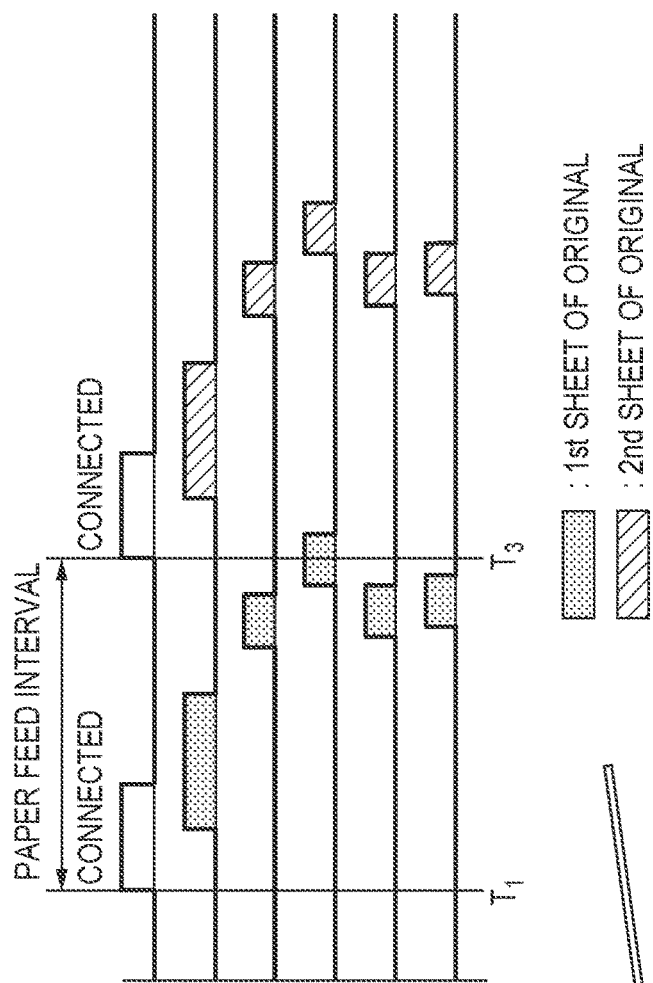
FIG. 11A is a timing chart showing the original feed timing in a comparative example.
Figure 11B:
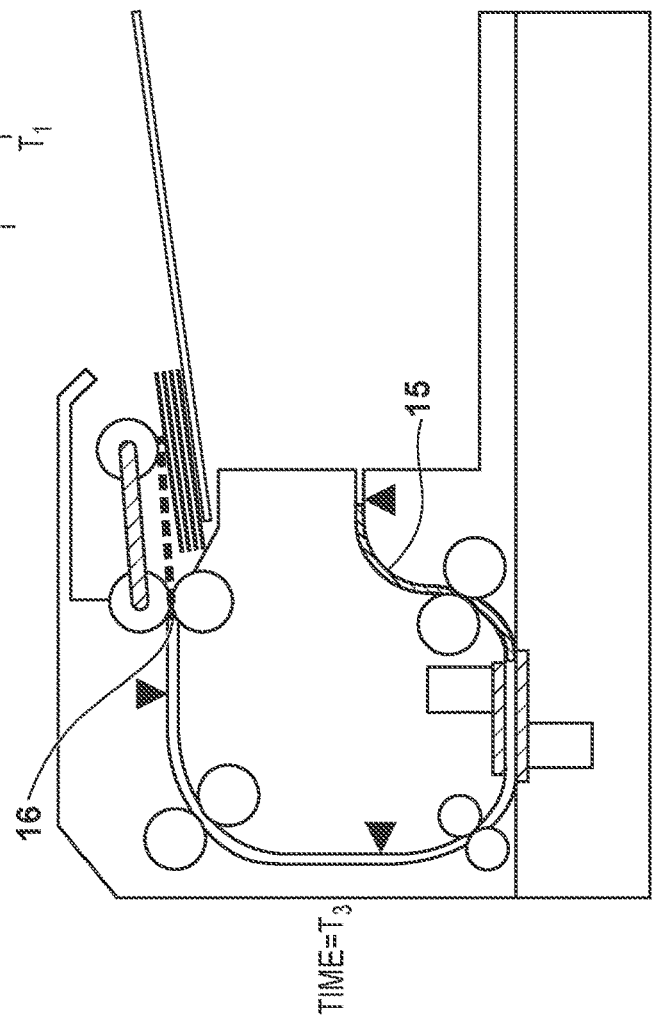
FIG. 11B is an explanation view showing an example of the positional relationship between originals in the comparative example.

FIG. 11A is a timing chart similar to FIG. 10A, in this alternative approach. FIG. 11B shows the positional relationship between originals at time $T_3$ of the timing chart shown in FIG. 11A.

In the above-described alternative approach as shown in FIG. 11A, the separation clutch 308 is kept in the shut-off state until time $T_3$ at which reading of the first original 15 is complete. At time $T_3$, the separation clutch 308 switches to the connected state, and feeding of the second original 16 is started. In this case, the time required for reading of each original is shorter than that in the case shown in FIG. 10A, but the paper feed interval between the originals prolongs. Accordingly, this alternative approach is against the need of the user having permitted a low reading quality by attaching importance to the productivity. By contrast, the above-described embodiment can relatively shorten the paper feed interval between originals. Therefore, it is to be understood that the above embodiment is also advantageous in the viewpoint of the productivity compared to the alternative approach.

6. Summary

Embodiments of the present disclosure have been explained in detail above with reference to FIGS. 1 to 11B. In the above-described embodiments, when the size of an original is a first size and the selected operation mode selected by the user is a first operation mode corresponding to a high reading quality, the original conveyance rollers are driven by a first rotation speed. When the size of an original is the above-mentioned first size and the selected operation mode is a second operation mode corresponding to a low reading quality, the original conveyance rollers are driven by a second rotation speed higher than the above-mentioned first rotation speed. When the size of an original is a second size smaller than the above-mentioned first size, the original conveyance rollers are driven by a third rotation speed (equal to the first rotation speed in an embodiment) regardless of the selected operation mode. When conveying a small-sized original in an arrangement like this, it is possible to eliminate or reduce inconveniences of original reading such as a failure of separation between originals caused by excessive overlapped conveyance.

In the above-described embodiments, the above-mentioned third rotation speed is a speed at which, when the size of an original is the above-mentioned second size, the leading end of a next original does not reach the separation sensor for detecting separation between originals during the roller suspension delay for temporarily stopping the conveyance of the next original. In this arrangement, although the time delay from the shut-off of the transmission of the driving force to the roller to the stoppage of the roller cannot be zeroed, it is possible to reliably produce a gap between a preceding original and a next original and correctly separate these originals.

In the above-described embodiments, the transmission of the driving force from the conveyance motor to the pick-up roller and the separation rollers can be shut off when the leading end of an original has reached the conveyance rollers. In this arrangement, it is not necessary to control the driving force of the conveyance motor to change the roller rotation speed, and a next original can be stopped before the separation sensor while conveying a preceding original to the downstream side by the conveyance rollers. After that, when the trailing end of the original is detected by the separation sensor, the transmission of the driving force of the conveyance motor to the pick-up roller and the separation rollers may be resumed. Consequently, a high productivity can be achieved by conveying originals while maintaining the paper feed interval between a preceding original and a next original to a short gap.

In the above-described embodiments, when the size of an original is the above-mentioned second size and the selected operation mode is the above-mentioned second operation mode, the quality of a read image generated by reading the original may be converted from a high reading quality to a low reading quality. The quality of a read image may include, for example, the reading resolution or the number of color components. In this arrangement, a read image having quality desired by the user can be provided while using a rotation speed not necessarily corresponding to the selected operation mode in order to avoid excessive overlapped conveyance. It is also possible to satisfy the need of the user who wants to reduce the data size of read image data.

7. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-019133, filed on Feb. 6, 2020, which is hereby incorporated by reference herein in its entirety.

What is claimed is:

1. An original reading apparatus comprising:
   a reading unit configured to optically read an image of an original;
   a pick-up roller configured to pick up originals placed on an original tray;
   a separating and conveying unit including a feed roller and a separating member, and configured to separately convey the originals picked up by the pick-up roller one by one, from a batch of originals, in a separating nip formed by the feed roller and the separating member;
   a conveyance roller configured to convey the original conveyed by the separating and conveying unit to the reading unit to cause the reading unit to read an image of the original;
   a conveyance motor configured to generate a driving force for rotating the pick-up roller and the feed roller;
   a clutch configured to switch between transmission of the driving force from the conveyance motor to the pick-up roller and the feed roller, and shut-off of the transmission;
   a separation sensor configured to detect the original conveyed between the feed roller and the conveyance roller in a conveyance direction; and
   a controller unit configured to control the clutch and the conveyance motor, the controller unit being configured to control the clutch to shut off the transmission of the driving force when a leading end of an original being conveyed reaches the conveyance roller, and perform the transmission of the driving force when a trailing end of the original is detected by the separation sensor in order to start conveyance of a subsequent original, and control the conveyance motor such that the pick-up roller and the feed roller that receive the driving force rotate at a given rotation speed, wherein the controller unit is configured to set the rotation speed to a first rotation speed when causing the reading unit to read an original having a first size at a first reading resolution, set the rotation speed to a second rotation speed higher than the first rotation speed when causing the reading unit to read an original having the first size at a second reading resolution lower than the first reading resolution, and set the rotation speed to a third rotation speed lower than the second rotation speed, regardless of designation of the reading resolution, when causing the reading unit to read an original having a second size smaller than the first size, and wherein an original having the second size has an original length shorter than a distance from the pick-up roller to the conveyance roller in the conveyance direction.

2. The original reading apparatus according to claim 1, wherein the controller unit causes the reading unit to read an original having the second size at the first reading resolution, regardless of designation of the reading resolution.

3. The original reading apparatus according to claim 1, wherein when instructed to read an original having the second size at the second reading resolution, the controller unit converts an image obtained by reading the original having the second size at the first reading resolution, to the second reading resolution.

4. The original reading apparatus according to claim 1, wherein the third rotation speed is equal to the first rotation speed.

5. The original reading apparatus according to claim 1, wherein the third rotation speed is a speed at which, when reading an original having the second size, a leading end of a subsequent original does not reach the separation sensor during suspension delay from cancellation of the transmission of the driving force to stoppage of the pick-up roller.

6. The original reading apparatus according to claim 1, wherein the controller unit determines whether an original is an original having the first size or an original having the second size, by using a plurality of sensors configure to detect presence or absence of an original on the original tray.

7. The original reading apparatus according to claim 1, wherein when reading an original having the first size, the controller unit sets the rotation speed in accordance with a reading resolution and a color mode of an image to be read by the reading unit, and, when reading an original having the second size, the controller unit sets the same rotation speed regardless of the reading resolution and the color mode.

8. The original reading apparatus according to claim 1, wherein an original having the second size is a name card original.

9. An original reading apparatus comprising:

a reading unit configured to optically read an image of an original;

a pick-up roller configured to pick up originals placed on an original tray;

a separating and conveying unit including a feed roller and a separating member, and configured to separately convey the originals picked up by the pick-up roller one by one, from a batch of originals, in a separating nip formed by the feed roller and the separating member;

a conveyance roller configured to convey the original conveyed by the separating and conveying unit to the reading unit to cause the reading unit to read an image of the original;

a conveyance motor configured to generate a driving force for rotating the pick-up roller and the feed roller;

a clutch configured to switch between transmission of the driving force from the conveyance motor to the pick-up roller and the feed roller, and shut-off of the transmission;

a separation sensor configured to detect the original conveyed between the feed roller and the conveyance roller in a conveyance direction; and a controller unit configured to control the clutch and the conveyance motor, the controller unit being configured to control the clutch to shut off the transmission of the driving force when a leading end of an original being conveyed reaches the conveyance roller, and perform the transmission of the driving force when a trailing end of the original is detected by the separation sensor in order to start conveyance of a subsequent original, and control the conveyance motor such that the pick-up roller and the feed roller that receive the driving force rotate at a given rotation speed, wherein the controller unit is configured to set the rotation speed in accordance with a reading resolution and a color mode of an image to be read by the reading unit, when causing the reading unit to read an original having a first size, and set the rotation speed to the same rotation speed regardless of the reading resolution and the color mode, when causing the reading unit to read an original having a second size smaller than the first size, and wherein an original having the second size has an original length shorter than a distance from the pick-up roller to the conveyance roller in the conveyance direction.

* * * * *